United States Patent
Kim et al.

(10) Patent No.: US 12,415,727 B2
(45) Date of Patent: Sep. 16, 2025

(54) METHOD FOR PREPARING NANO-MATERIALS AND APPARATUS THEREOF

(71) Applicant: Naieel Technology, Daejeon (KR)

(72) Inventors: Jaewoo Kim, Daejeon (KR); Eun Kwang Park, Daejeon (KR); Jae Hoon Kim, Daejeon (KR)

(73) Assignee: NAIEEL TECHNOLOGY, Daejeon (KR)

( * ) Notice: Subject to any disclaimer, the term of this patent is extended or adjusted under 35 U.S.C. 154(b) by 225 days.

(21) Appl. No.: 17/208,661

(22) Filed: Mar. 22, 2021

(65) Prior Publication Data

US 2022/0055900 A1   Feb. 24, 2022

(30) Foreign Application Priority Data

Aug. 19, 2020 (KR) .......................... 10-2020-0103857

(51) Int. Cl.
| | | |
|---|---|---|
| *C01B 21/064* | (2006.01) | |
| *B01J 19/24* | (2006.01) | |
| *B82Y 30/00* | (2011.01) | |
| *B82Y 40/00* | (2011.01) | |

(52) U.S. Cl.
CPC .......... *C01B 21/0641* (2013.01); *B01J 19/24* (2013.01); *B82Y 30/00* (2013.01); *B82Y 40/00* (2013.01); *C01P 2004/03* (2013.01); *C01P 2004/13* (2013.01)

(58) Field of Classification Search
CPC .. C01B 21/0641; C01P 2004/13; B82Y 40/00
See application file for complete search history.

(56) References Cited

U.S. PATENT DOCUMENTS

| | | | |
|---|---|---|---|
| 11,618,685 B2 | 4/2023 | Zo et al. | |
| 2014/0349105 A1* | 11/2014 | Yamazaki | C08G 59/4042 |
| | | | 428/323 |
| 2018/0215625 A1* | 8/2018 | Zo | C23C 16/4418 |
| 2019/0322536 A1* | 10/2019 | Zo | C23C 16/342 |
| 2019/0337812 A1* | 11/2019 | Zo | B01J 8/008 |

FOREIGN PATENT DOCUMENTS

| | | | | |
|---|---|---|---|---|
| CN | 103964403 A | * | 8/2014 | |
| CN | 106882772 A | * | 6/2017 | ............. B82Y 30/00 |
| CN | 112320770 A | * | 2/2021 | ............. B01J 19/24 |
| JP | 2001-115077 A | | 4/2001 | |
| JP | 2006-153638 A | | 6/2006 | |
| JP | 2016069194 A | * | 5/2016 | |

(Continued)

OTHER PUBLICATIONS

Machine translation of Kuromura et al. (JP2016069194), publication date May 9, 2016.*

(Continued)

*Primary Examiner* — Jun Li
(74) *Attorney, Agent, or Firm* — Dinsmore & Shohl LLP; Yongsok Choi, Esq.

(57) ABSTRACT

According to an embodiment of the present disclosure, mass production is possible and production time may be reduced, thus increasing yield. Furthermore, a method and apparatus for manufacturing a nanomaterial, which can manufacture a high-purity nanomaterial are disclosed.

5 Claims, 16 Drawing Sheets

(56) References Cited

FOREIGN PATENT DOCUMENTS

| KR | 101734324 B1 | * | 5/2017 |
| KR | 10-2018-0089959 A | | 8/2018 |
| KR | 10-2019-0035662 A | | 4/2019 |
| KR | 20190035662 A | * | 4/2019 |

OTHER PUBLICATIONS

Zhong et al., Fabrication of porous boron nitride by using polyborazylene as precursor, polymethylmethacrylate as reaction agent, 2019.*

Machine translation of Song et al. (CN103964403), publication date Aug. 6, 2014.*

Machine translation of Fu (CN106882772A), publication date Jun. 23, 2017.*

Chinese Office Action corresponding to Application No. 202011212564.3 and issued on Feb. 7, 2023, 5 pages.

* cited by examiner

METHOD FOR PREPARING NANO-MATERIALS AND APPARATUS THEREOF

CROSS-REFERENCE TO RELATED APPLICATION(S)

This application claims priority from Korean Patent Application No. 10-2020-0103857 filed on Aug. 19, 2020 in the Korean Intellectual Property Office, and all the benefits accruing therefrom under 35 U.S.C. 119, the contents of which in its entirety are herein incorporated by reference.

BACKGROUND

1. Field

The present disclosure relate to a nanomaterial. More particularly, the present disclosure relates to a method and apparatus for manufacturing a nanomaterial.

2. Description of the Related Art

Nanoscale materials are attracting a lot of attention in various industries including the electronics industry due to various excellent characteristics thereof, but there have been limitations in practical industrial application due to various problems in the manufacturing process, such as a limitation in mass production of high-quality nanomaterials.

Among various nanoscale materials, particularly boron nitride nanotubes (BNNTs) have mechanical characteristics and thermal conductivity that are similar to those of commonly known carbon nanotubes (CNTs), while exhibiting excellent electrical insulation, heat resistance, chemical stability, and the like. In addition, boron constituting BNNTs has a thermal neutron absorption capacity that is about 200,000 times greater than that of carbon constituting CNTs, and thus is useful as a neutron-shielding material.

However, these BNNTs have difficulties in the manufacturing process, such as being synthesized at a high temperature of 1,000° C. or higher, and thus mass production technology has not been developed worldwide. This is not limited only to BNNTs, and there is a need to develop high-quality mass production technology for other nanomaterials.

SUMMARY

Embodiments of the present disclosure provide a manufacturing method and apparatus for manufacturing a nanomaterial, which enable mass production, can reduce production time, and has a high production yield.

Embodiments of the present disclosure also provide a manufacturing method and apparatus for manufacturing a high-purity nanomaterial.

According to an embodiment of the present disclosure, a method of manufacturing a nanomaterial includes: preparing powder including a first material; forming a dispersion solution including the powder; molding a structure using the dispersion solution, the structure being a precursor for synthesis of the nanomaterial; generating pores in the structure; and synthesizing the nanomaterial using the structure.

The preparation of the powder may include: preparing first powder including a first material and a second material; forming second powder by introducing the first powder into a pulverized region formed by air; and collecting the second powder.

The dispersion solution may include not only a support of the powder and a third material used in forming the pores.

The method may further include injecting the dispersion solution into a mold and heating the mold.

The method may further include subjecting the structure to oxidation treatment.

The method may include transferring the structure to a reaction zone of a reaction chamber, and driving the reaction zone to synthesize a nanomaterial using the structure.

According to another embodiment, an apparatus for manufacturing a nanomaterial includes: a powder former for nanosizing first powder including a first material and forming second powder including the first material and a second material; a solution former for forming a dispersion solution including the second powder; a mold into which the dispersion solution is injected; a molding machine for molding the dispersion solution injected into the mold into a porous structure including a precursor for synthesis of the nanomaterial and having pores; and a reactor for forming the nanomaterial using the structure.

The powder former may include a pulverized region formed by air, and may be provided to form the second powder by introducing the first powder into the nanosized region.

The solution former may be formed such that the dispersion solution further includes a support of the second powder and a third material used in forming the pores.

The molding machine may further include a heating furnace provided to heat the mold into which the dispersion solution is injected.

The apparatus may further include an oxidation treatment machine that performs oxidation treatment on the molded structure.

The apparatus may further include a reaction chamber including a reaction zone provided to form a nanomaterial on the structure.

A method and apparatus for manufacturing a nanomaterial according to the present embodiment enable mass production and can reduce production time, thus increasing yield.

In addition, high-purity nanomaterials, particularly BNNTs can be manufactured.

DETAILED DESCRIPTION

Figure 1:
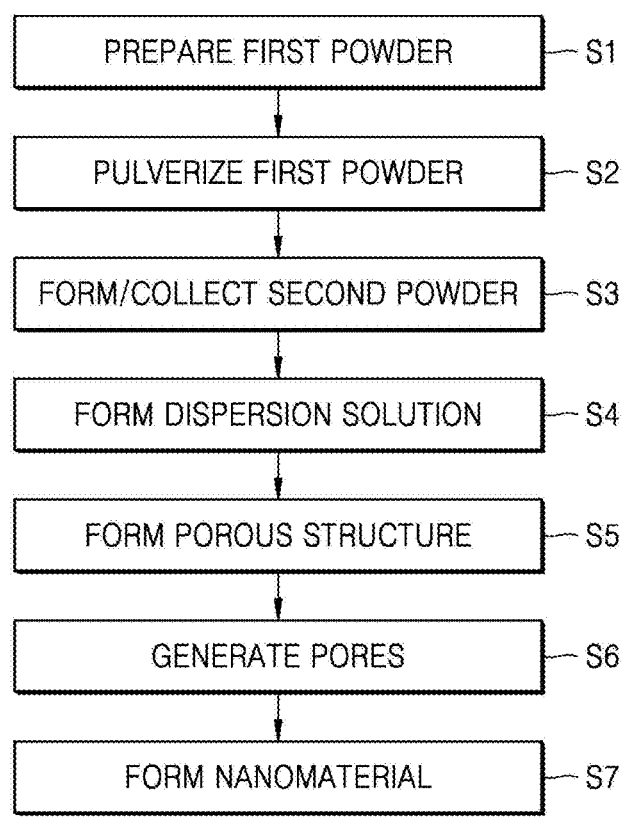
FIG. 1 is a flowchart illustrating a method of manufacturing a nanomaterial according to an embodiment.

As embodiments allow for various changes and numerous embodiments, example embodiments will be illustrated in the drawings and described in detail in the detailed description. Effects and features of the present disclosure and a method of achieving them will become apparent with reference to the embodiments described below in detail together with the drawings. However, the present disclosure is not limited to the embodiments disclosed below and may be implemented in various forms.

Hereinafter, embodiments of the present disclosure will be described in detail with reference to the accompanying drawings. In description with reference to the drawings, like reference numerals denote like or corresponding elements and a detailed description thereof will be provided only once.

In the embodiments set forth herein, the terms first, second, and the like are not intended to limit the present disclosure, but are used to distinguish one element from another.

An expression used in the singular encompasses the expression of the plural, unless it has a clearly different meaning in the context.

In the following embodiments, the terms such as including, having, and the like are intended to indicate the existence of the features or elements described in the specification, and are not intended to preclude the possibility that one or more other features or elements may be added.

Sizes of components in the drawings may be exaggerated or reduced for convenience of explanation. In other words, since sizes and thicknesses of components in the drawings are arbitrarily illustrated for convenience of explanation, the present disclosure is not limited thereto.

In the following embodiments, the x-axis, y-axis, and z-axis are not limited to three axes of the rectangular coordinate system, and may be interpreted in a broader sense. For example, the x-axis, y-axis, and z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Hereinafter, a method of manufacturing a nanomaterial according to an embodiment of the present disclosure will be described.

First, powder including a first material may be prepared.

According to one embodiment, the powder may be finely pulverized and may include the first material.

Alternatively, as illustrated in FIG. 1, in the preparation of the powder, at first, first powder is formed (S1), and the first powder may be pulverized (S2), thereby forming second powder to collect the second powder (S3).

According to one embodiment, the first powder may include the first material.

Figure 2:
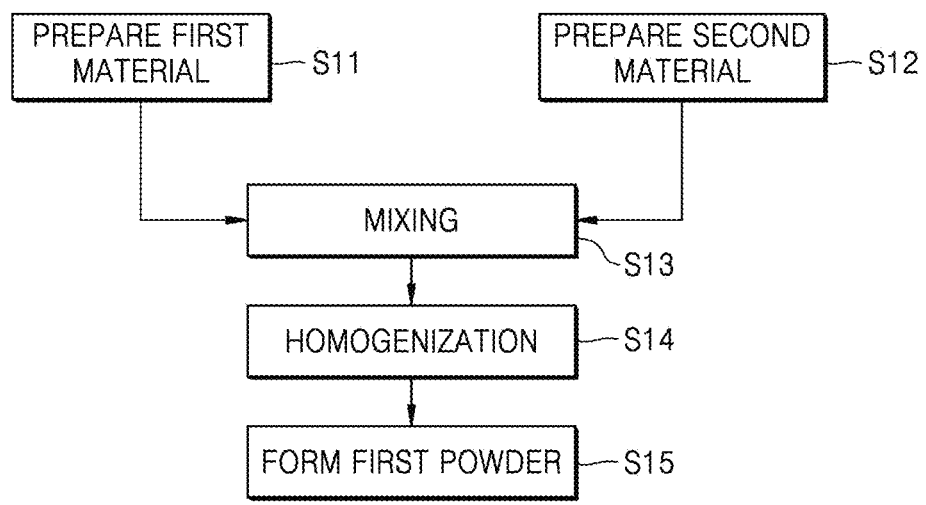
FIG. 2 is a flowchart illustrating a method of preparing first powder according to an embodiment.

The process of forming the first powder will be described in more detail with FIG. 2.

According to one embodiment, the first material is prepared (S11), and a second material is prepared (S12).

Alternatively, the first material may include boron, and for example, the boron may have a diameter of about 3 μm to about 5 μm. However, the present disclosure is not necessarily limited thereto, and the boron may have a diameter of 0.01 μm to 7 μm.

The boron may be crystalline and/or amorphous boron.

Since crystalline boron has high hardness, crystalline boron contributes to the pulverization of catalyst metal particle debris generated from a vessel during a pulverization process, such as a pulverization process using an air vortex, and at the same time, nanosized boron may be coated or embedded on or in the surfaces of catalyst metal nanoparticles, thereby obtaining highly efficient seed nanoparticles. However, in the case of using crystalline boron, it may take a long time to pulverize, causing the entire process for manufacturing a nanomaterial, e.g., BNNTs to take a long time, and consequently, productivity may be reduced. In addition, when crystalline boron is used, catalyst metal nanoparticles may be generated more than required, which act as impurities of BNNTs, which are a finally manufactured nanomaterial, and thus the amount of impurities increases, resulting in a reduction in the purity of BNNTs. Furthermore, an additional precise purification process is required to reduce the impurities, causing a problem of increasing manufacturing costs.

Thus, according to an embodiment of the present disclosure, the boron may be amorphous boron rather than crystalline boron. When amorphous boron is used, boron nanopowder may be obtained even by a short-term nanosizing process. Furthermore, it may be possible to produce BNNTs with high yield.

Meanwhile, the first powder may further include a second material, and alternatively, the second material may be a catalyst material. Alternatively, the catalyst may be provided in a powder form. The catalyst is more effective for amorphous boron. When amorphous boron is used, unlike the case of using crystalline boron in the pulverization process by an air vortex, metal nanoparticle impurities are not generated and a large amount of precursor nano-powder may be prepared within a very short time. Such a catalyst is mixed with boron particles during the pulverization process of the first powder to form precursor particles, and the precursor particles act as seeds during BNNT synthesis and react with nitrogen, thereby contributing to the synthesis of BNNTs. The catalyst material may include Fe, Mg, Ni, Cr, Co, Zr, Mo, W, and/or Ti. Alternatively, the catalyst material may be at least one material selected from the group consisting of MgO, Fe, FeO, $Fe_2O_3$, $Li_2O$, and $MgB_2$.

The boron and the catalyst may be mixed in a ratio of 9.9:0.1 to 7:3. When the proportion of the catalyst is less than 1%, it is impossible to sufficiently obtain catalyst particles required for the production of BNNTs. When the proportion of the catalyst exceeds 30%, it is not efficient for the production of seed particles through the formation of a boron-catalyst particle composite in the pulverization process by an air vortex, and it may rather act as impurities of produced BNNTs.

As such, the first material is mixed with the second material (S13), and then the mixture is homogenized (S14).

According to an alternative embodiment, the homogenization may include mesh sieving for the mixed powder. An agitator may be used for the sieving.

The first powder is formed by homogenizing the mixed powder (S15).

Next, as depicted in FIG. 1, the first powder is pulverized (S2).

According to an alternative embodiment, the pulverization of the first powder may be performed using an air vortex. That is, the pulverization operation is performed by introducing the first powder into an air vortex rotating at high pressure. According to one embodiment, cold air that is rotated at high pressure may be used. According to one embodiment, the first powder may be in a state in which boron powder and catalyst powder are mixed, and the boron powder is embedded with the optimum amount of catalyst powder according to pulverization by the air vortex, thereby providing the optimal conditions and/or particle size for the synthesis and growth of BNNTs.

As such, the first powder is pulverized using a high-pressure air vortex to form second powder, and the second powder is collected (S3).

The collection of the second powder may be performed such that, while air containing the second powder is allowed to pass through a membrane, the second powder is caught by the membrane and collected by a collection unit. The collection may be performed through various processes.

After the second powder is formed and collected, a dispersion solution is formed using the second powder (S4), and formed into a porous structure as a precursor and pores are generated (S5 and S6). The formation of the structure and the generation of pores are not necessarily sequentially performed, and pores may be generated in the process of forming the structure.

Figure 3:
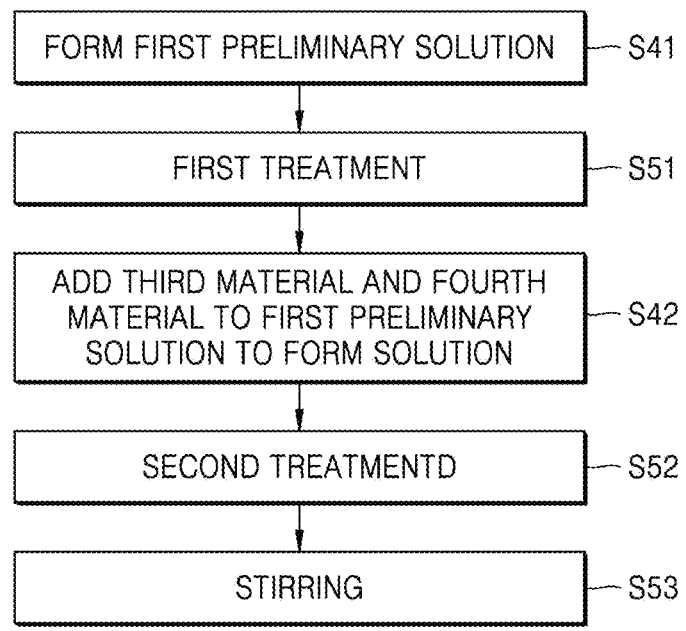
FIG. 3 is a flowchart illustrating a method of preparing a dispersion solution according to an embodiment.

FIG. 3 illustrates an embodiment of a method of preparing a dispersion solution.

First, a first preliminary solution is formed (S41). The first preliminary solution includes the second powder and deionized water. A weight ratio of the second powder and the deionized water may be approximately 1:2, but the present disclosure is not limited thereto, and the weight ratio of the deionized water to the second powder may be in the range of 1.5:1 to 4:1.

Subsequently, the first preliminary solution is first treated (S51). By the first treatment, the second powder and the deionized water of the first preliminary solution are mixed well. According to one embodiment, the first treatment may be horn sonication.

According to an alternative embodiment, a third material and a fourth material are added to the first preliminary solution to form a dispersion solution (S42). According to one embodiment, the third material may include sucrose, and the fourth material may be a foaming agent.

Sucrose may be well soluble in deionized water, and when a porous structure is formed (see S5 in FIG. 1), air bubbles and/or pores may be generated in the structure through thermal dissociation, and/or carbon remaining after the dissociation may act as a support for boron, which is the first material.

Alternatively, the third material may be a water-soluble polymer, and the water-soluble polymer may include a vinyl-based polymer such as starch, molasses, maltose, polypropylene carbonate (PPC), polyvinyl alcohol (PVA), or polyvinyl butyral (PVB), and a cellulose-based polymer such as ethylcellulose (EC). The third material enables air bubbles and/or pores to be generated in the structure during the thermal dissociation process, and/or carbon remaining after the dissociation may serve as a support for boron, which is the first material.

The foaming agent may greatly accelerate the generation of air bubbles and/or pores during the formation of the structure. Azodicarbonamide (ADCA) may be used as the foaming agent, but the present disclosure is not limited thereto, and alternatively, a water-soluble foaming agent that can be decomposed at 200° C. or less may be used.

The functions of the third material and the foaming agent are the same as in embodiments described below.

Figure 6:
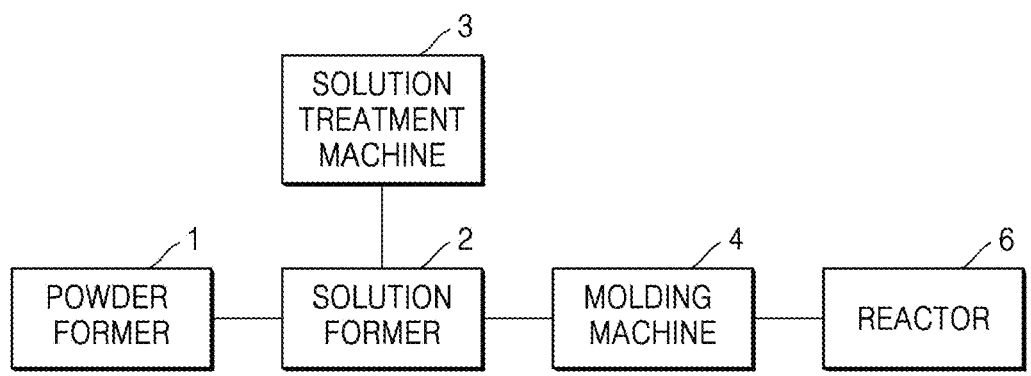
FIG. 6 is a schematic block diagram illustrating an apparatus for manufacturing a precursor and a nanomaterial according to an embodiment.

Such a process of generating air bubble and/or pores may be performed in a molding machine 4 of FIG. 6.

According to one embodiment, a weight ratio of the second powder to the sucrose may be approximately 1:2, but the present disclosure is not necessarily limited thereto, and the weight ratio of the sucrose to the second powder may be in the range of 0.5:1 to 4:1.

The weight ratio of the second powder and the foaming agent may be 1:0.15, but the present disclosure is not necessarily limited thereto, and the weight ratio of the foaming agent to the second powder may be in the range of 0.05:1 to 0.3:1.

A second treatment is performed on the solution prepared as described above (S52). The second treatment may be bath sonication. By performing the second treatment, the solubility of sucrose in the solution may be improved and the dispersibility of the second powder may be improved.

Subsequently, the solution is stirred (S53) to form a dispersion solution.

Figure 4:
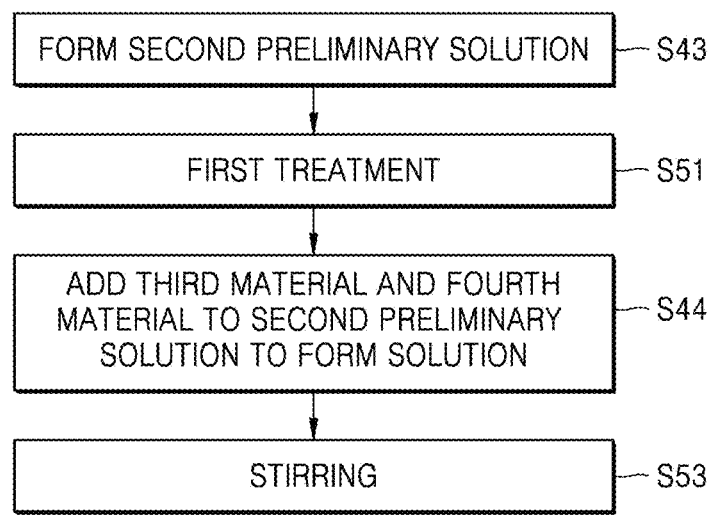
FIG. 4 is a flowchart illustrating a method of preparing a dispersion solution according to another embodiment.

FIG. 4 illustrates another embodiment of a method of preparing a dispersion solution.

At first, a second preliminary solution is formed (S43). The second preliminary solution includes deionized water in which sucrose, which is the third material, is dissolved, and may be prepared by mixing second powder therewith.

Subsequently, the second preliminary solution is first treated (S51). By the first treatment, the second powder and sucrose, which is the third material, of the second preliminary solution may be mixed well, and the solubility of the third material and the dispersibility of the second powder may be improved. According to one embodiment, the first treatment may be horn sonication.

According to an alternative embodiment, a forming material, which is the fourth material, is added to the second preliminary solution to form a solution (S44).

Subsequently, the solution is stirred (S53) to form a dispersion solution.

The component ratio of the finally formed dispersion solution may be the same as in the above-described embodiment.

Figure 5:
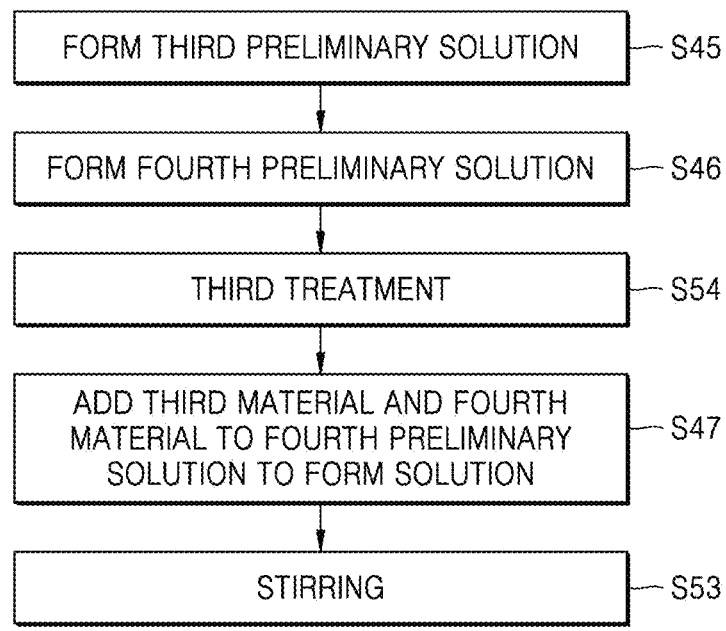
FIG. 5 is a flowchart illustrating a method of preparing a dispersion solution according to another embodiment.

FIG. 5 illustrates another embodiment of a method of preparing a dispersion solution.

At first, a third preliminary solution is formed (S45). The third preliminary solution may include deionized water in which a certain amount of sucrose, which is the third material, is dissolved. The third preliminary solution is mixed with second powder to form a fourth preliminary solution (S46).

Then, a third treatment is performed (S54), and the third treatment may be tip sonication. According to one embodiment, the third treatment (S54) may be performed simultaneously with the formation of the fourth preliminary solution (S46). In addition, the present disclosure is not limited to the case of forming the fourth preliminary solution by mixing the third preliminary solution with a certain amount of second powder at once, and the fourth preliminary solution may be formed by third treatment that is simultaneously performed while a small amount of second powder is added to the third preliminary solution a plurality of times. This can be applied equally to each preliminary solution and solution formation of the above-described embodiments.

Next, the rest of sucrose, which is the third material, and a foaming agent, which is the fourth material, are added to the fourth preliminary solution to form a solution (S47), and then the solution is stirred (S53) to form a dispersion solution.

The component ratio of the finally formed dispersion solution may be the same as in the above-described embodiment.

According to the above-described embodiments, sucrose is well dissolved in deionized water by the first treatment, the second treatment, and/or the third treatment, and the surface of the second powder is coated with a sucrose component, and the dispersibility of the second powder may be improved. In addition, through the addition of the fourth material, the effect of forming air bubbles and/or pores during the formation of the structure may be further increased.

In addition, sucrose, which is the third material, melts as the temperature of the dispersion solution in the mold increases, and thus the viscosity thereof increases. In addition, as the temperature increases, air bubbles and/or pores are generated through thermal dissociation, thus increasing the porosity of the inside of the structure, and carbon, which is a residue resulting from the thermal dissociation, may serve as a support for the second powder of the structure.

After the above-described solution is prepared, a block-type structure as a precursor is formed using the solution, followed by reaction in a nitrogen atmosphere, to form a nanomaterial (S7).

The formation of the structure may be performed through a baking process in a heating furnace in the state in which the above-described dispersion solution is accommodated in a specific mold. The backing process may be performed at a temperature ranging from about 150° C. to about 250° C. At this time, the sucrose in the dispersion solution begins to melt as the temperature of the heating furnace rises, and is thermally dissociated near 200° C. to be decomposed into water (vapor) and carbon. Vapor plays a role in forming pores inside the structure, and carbon remains as a residue and acts as a support inside the structure. In addition, the foaming agent in the dispersion solution thermally dissociates near 200° C. to generate carbon dioxide, and thus severs to form uniform pores inside the structure. Through this process, a precursor with sufficient pores formed inside the structure may be formed. In this regard, the thermal dissociation temperature may vary depending on the type of the foaming agent.

According to an alternative embodiment, after the backing process, the block-shaped porous precursor structure may be further subjected to oxidation treatment of the baked structure.

The oxidation treatment may be performed at a temperature ranging from about 300° C. to about 600° C.

By the oxidation treatment, at least about 30% to about 60% of carbon remaining in the structure may be removed, and accordingly, a high-quality nanomaterial with high purity may be prepared.

After the structure is formed, a nanomaterial is formed using the structure (S7).

Such a nanomaterial may be formed from the block-type precursor structure by a reaction gas in the reaction zone of the reaction chamber. This will be described below in more detail.

Meanwhile, a manufacturing apparatus for forming the precursor structure as described above will be described.

Referring to FIG. 6, an apparatus for manufacturing a nanomaterial according to an embodiment may include a powder former 1, a solution former 2, a solution treatment device 3, the molding machine 4, and a reactor 6.

Figure 7:
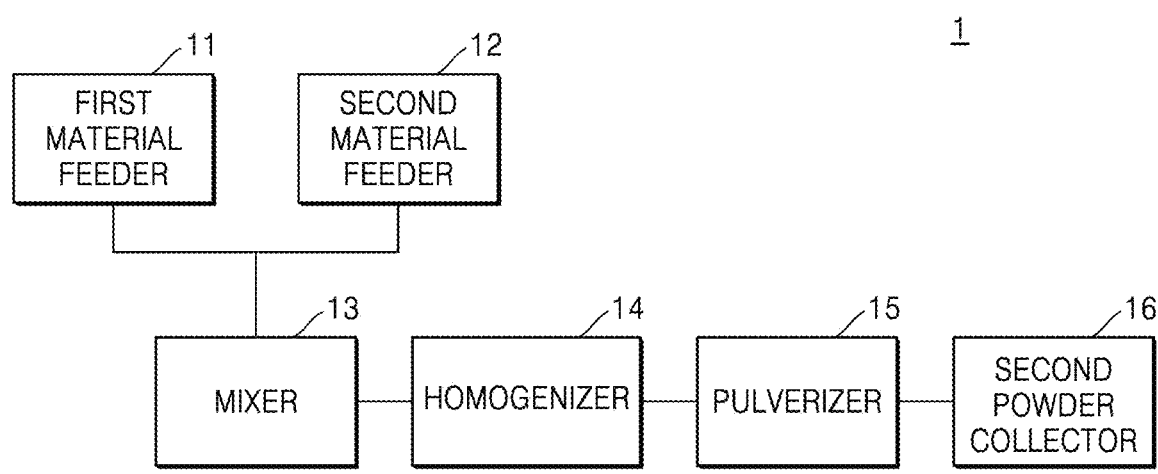
FIG. 7 is schematic block diagram illustrating a second powder preparation apparatus according to an embodiment.

Referring to FIG. 7, the powder former 1 may include a first material feeder 11, a second material feeder 12, a mixer 13, a homogenizer 14, a pulverizer 15, and a second powder collector 16.

The first material feeder 11 may be provided to store the first material and automatically and/or manually feed the first material. The second material feeder 12 may also be provided to store and automatically and/or manually feed the second material.

The first material and the second material provided by the first material feeder 11 and the second material feeder 12 are supplied to the mixer 13 and mixed with each other. The mixing may be performed at a predetermined ratio.

Thereafter, the mixed materials may be homogenized while passing through the homogenizer 14. According to one embodiment, the homogenizer 14 may include a sieving machine and/or an agitator. Thus, the material mixed through the homogenizer 14 may be homogenized in a range of a predetermined particle size to form first powder.

Next, the homogenized first powder is transferred to the pulverizer 15, pulverized through the pulverizer 15 to form second powder, and the second powder is collected through the second powder collector 16.

According to one embodiment, the pulverizer 15 may use an air vortex. By providing the first powder to the high-pressure air vortex, the first powder may be pulverized to form second powder.

The formed second powder may be collected through the second powder collector 16.

The second powder collector 16 may include a membrane and a collecting unit, and air containing the second powder may be allowed to pass through the membrane and the second powder may be caught by the membrane and collected by the collecting unit. Such collection may be performed through various processes.

The solution former 2 and the solution treatment device 3 may be provided in combination with each other. The solution former 2 may be a device capable of introducing the second powder, the third material, the fourth material, and deionized water into a mixing container and mixing same in a certain ratio.

The solution treatment device 3 may be operated in connection with the solution former 2 for the prepared solution and/or the preliminary solution of each process.

The solution treatment device 3 may include a horn sonicator, a bath sonicator, and/or a tip sonicator. Furthermore, the solution treatment device 3 may further include an agitator.

According to one embodiment, a first preliminary solution is formed through the solution former 2. The first preliminary solution includes the second powder and deionized water. The weight ratio of the second powder and the deionized water may be approximately 1:2, but the present disclosure is not necessarily limited thereto, and the weight ratio of the deionized water to the second powder may be in the range of 0.5:1 to 4:1.

Subsequently, the first preliminary solution is treated through a first treatment device of the solution treatment device 3. By the first treatment, the second powder may be dispersed well in deionized water. According to one embodiment, the first treatment device may be a horn sonicator.

Through the solution former 2, a third material and a fourth material are added to the first preliminary solution to form a solution. According to one embodiment, the third material may include sucrose, and the fourth material may be a foaming agent. According to one embodiment, the weight ratio of the second powder to the sucrose may be approximately 1:2, but the present disclosure is not necessarily limited thereto, and the weight ratio of the sucrose to the second powder may be in the range of 0.5:1 to 4:1. The weight ratio of the second powder and the foaming agent may be 1:0.15, but the present disclosure is not necessarily limited thereto, and the weight ratio of the foaming agent to the second powder may be in the range of 0.05:1 to 0.3:1.

The solution prepared as described above is further subjected to a second treatment through a second treatment device of the solution treatment device 3. The second treatment device may be a bath sonicator. By performing the second treatment, sucrose, which is the third material, may be dissolved well, and the mixture may also be dispersed uniformly.

Subsequently, the solution is stirred using an agitator of the solution treatment device 3.

According to another embodiment, a second preliminary solution is formed using the solution former 2. The second preliminary solution includes a portion of sucrose, which is the third material, and deionized water. The second preliminary solution is mixed with second powder.

Subsequently, the second preliminary solution is first treated through the first treatment device of the solution treatment device 3. By the first treatment, the second powder and deionized water may be mixed well and sucrose may be easily dissolved. According to one embodiment, the first treatment device may be a horn sonicator.

A solution is formed using the solution former 2 by adding the rest of the third material and a foaming material, which is the fourth material, to the second preliminary solution.

Subsequently, the solution is stirred using an agitator of the solution treatment device 3.

According to another embodiment, a third preliminary solution is formed using the solution former 2. The third preliminary solution may include a portion of sucrose, which is the third material, and deionized water. The third preliminary solution is mixed with second powder to form a fourth preliminary solution.

In addition, a third treatment is performed on the fourth preliminary solution through a third treatment device of the solution treatment device 3, and the third treatment device may be a tip sonicator. According to one embodiment, the third treatment may be performed simultaneously with the formation of the fourth preliminary solution In addition, the present disclosure is not limited to the case of forming the fourth preliminary solution by mixing the third preliminary solution with a certain amount of second powder at once, and the fourth preliminary solution may be formed by third treatment that is simultaneously performed while a small amount of second powder is added to the third preliminary solution a plurality of times. This can be equally applied to each preliminary solution and solution formation of the above-described embodiments.

Next, a solution is formed using the solution former 2 by adding the rest of sucrose as the third material and a foaming agent as the fourth material to the fourth preliminary solution, and then the solution is stirred using an agitator of the solution treatment device 3. Finally, the component ratio of the solution may be the same as in the above-described embodiment.

Figure 9:
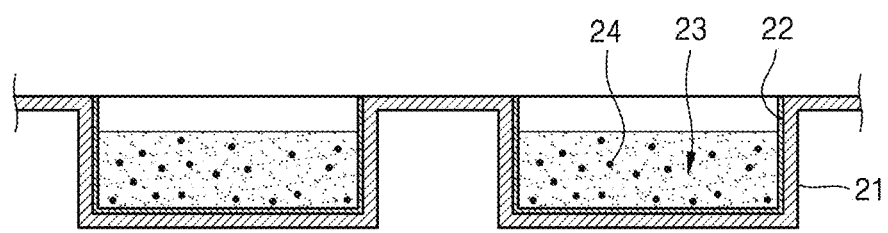
FIG. 9 is a schematic cross-sectional view illustrating an embodiment of a mold for molding a precursor structure.

After the solution is formed in this way, the solution is injected into a mold 21 and molded through the molding machine 4. As can be seen in FIG. 9, the mold 21 may have a structure in which a plurality of molds are connected in parallel. A coating layer 22 may be formed on the inner wall of the mold 21. The coating layer 22 may be provided to have heat resistance, chemical resistance, and non-stick and non-wetting properties.

A dispersion solution 23 injected into the mold 21 may include a certain amount of air bubbles 24 as the temperature increases.

The molding machine 4 may include a baking furnace provided to accommodate a plurality of molds 21 as described above. The baking process may be performed at a temperature ranging from 150° C. to 250° C.

Figure 8:
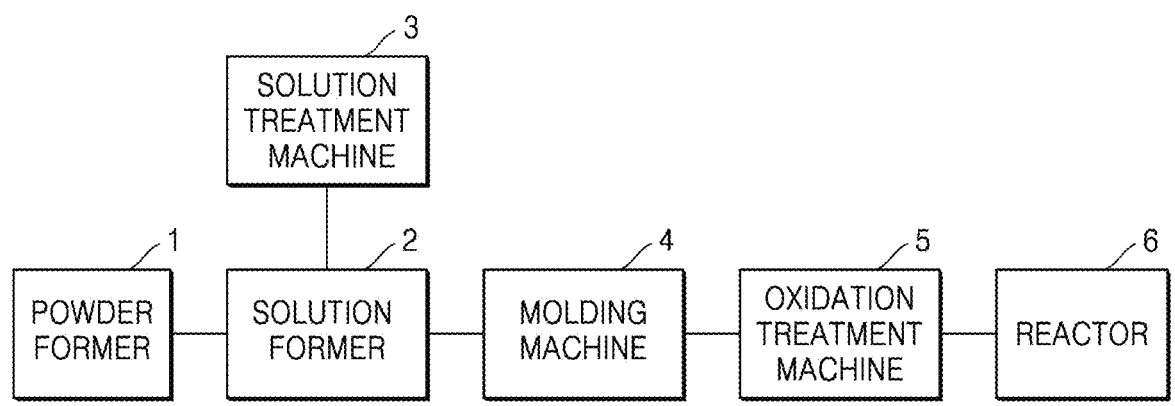
FIG. 8 is a schematic block diagram illustrating an apparatus for manufacturing a nanomaterial according to another embodiment.

As shown in FIG. 8, an apparatus for manufacturing a nanomaterial according to another embodiment may further include the oxidation treatment machine 5 independent of the molding machine 4. The oxidation treatment machine 5 may be a furnace positioned adjacent to the molding machine 4. The oxidation treatment machine 5 may be operated in a temperature range of 300° C. to 600° C. while air or oxygen is injected in order to oxidize carbon of the molded structure.

However, the molding machine 4 and the oxidation treatment machine 5 are not necessarily provided separately, and different operations may be performed by changing the temperature range setting for one apparatus. In this case, the oxidation treatment machine 5 may have a different gas environment, that is, air or oxygen may be injected in order to aid oxidation.

After the molding and/or oxidation treatment is completed as described above, a precursor structure is obtained.

Such a precursor structure may be formed into a block shape or a disk shape, or may be formed into a pallet shape.

The precursor structure is transferred into a heated reactor and a reaction gas is supplied thereto, thereby forming a nanomaterial. In one embodiment, the growth of BNNTs may be performed by reacting the precursor structure with a nitrogen reaction gas.

Figure 10A:
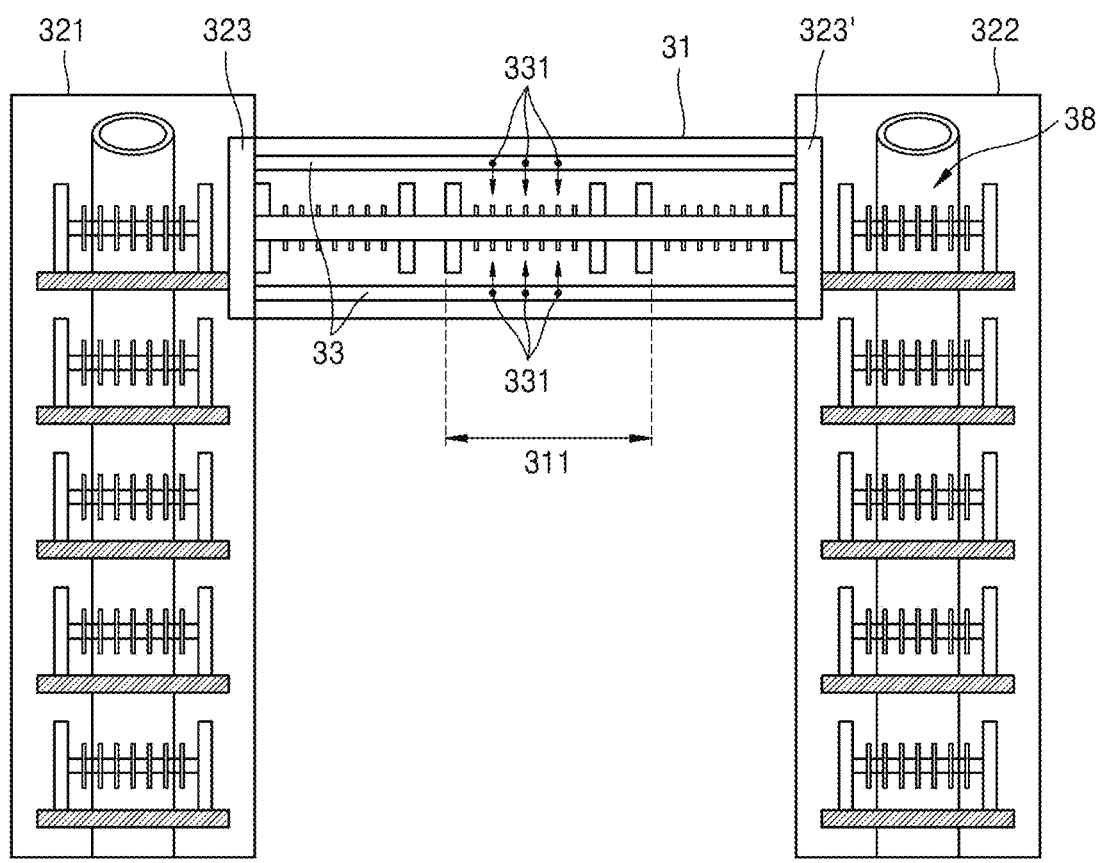
FIG. 10A is a view illustrating an embodiment of a reactor for synthesizing a nanomaterial.

An embodiment of the reactor is illustrated in FIG. 10A, and the reactor may include a reaction chamber 31, an input chamber 321, and a discharge chamber 322.

The reaction chamber 31 accommodates the above-described precursor structure, and has a transfer path for transferring a reaction module 38 that accommodates the precursor structures, and includes, on a portion of the transfer path, a reaction zone for growing a nanomaterial by supplying a reaction gas to the precursor structure.

The reaction zone 311 is a region in which an appropriate temperature for reaction can be maintained and a reaction gas is provided by a gas supply pipe 33. According to one embodiment, the reaction gas may be a nitrogen-containing reaction gas, and accordingly, BNNTs may grow from the precursor structure. Specifically, the reaction gas supplied to the reaction chamber 31 is not particularly limited, but nitrogen ($N_2$) or ammonia ($NH_3$) may be used, and a mixed gas thereof may also be supplied to the reaction chamber 31. Alternatively, hydrogen ($H_2$) may be additionally mixed and used.

The reaction gas may be supplied to the reaction chamber 31 at a rate of about 10 sccm to about 1,000 sccm. When the reaction gas is supplied at a rate of less than 10 sccm, the amount of a nitrogen element supplied is small, and thus the nitration reaction efficiency of boron is deteriorated, and accordingly, there is a need to perform the reaction for a long period time. When the reaction gas is supplied at a rate of greater than 1,000 sccm, boron powder in the precursor structure is ablated by the rapid transfer rate of the reaction gas, resulting in reduced BNNT production yield.

Heat treatment in the reaction chamber 31 may be performed in a temperature range of about 1,050° C. to about 1,450° C. for about 0.5 hours to about 6 hours to obtain BNNTs.

An alumina tube may be used as the reaction chamber 31, but the present disclosure is not necessarily limited thereto, and the reaction chamber 31 may be formed of a heat-resistant material capable of withstanding a temperature of approximately 1500° C.

The input chamber 321 and the discharge chamber 322 may be connected to the front and rear ends of the reaction chamber 31, respectively, and gates 323 and 323' may be provided between the reaction chamber 31 and the input chamber 321 and between the reaction chamber 31 and the discharge chamber 322 to separate an environment in the chamber. That is, gates 323 and 323' may be provided between the input chamber 321 and the discharge chamber 322.

A vacuum treatment unit (not shown) may be connected to the reaction chamber 31 to control the degree of vacuum inside the reaction chamber 31, and to this end, may include a vacuum pump and a controller. The vacuum treatment unit is connected to the input chamber 321, but the present disclosure is not necessarily limited thereto, and may be further connected to the discharge chamber 322.

A temperature controller (not shown) may be connected to the reaction chamber 31, and although not shown in the drawings, the reaction chamber 31 may include a heating unit for directly adjusting the temperature inside the reaction chamber 31 and a controller for controlling the heating unit.

The input chamber 321 is provided at the front end of the reaction chamber 31. The input chamber 321 accommodates a plurality of reaction modules 38 and transfers N reaction modules from among the plurality of reaction modules to the reaction chamber 31. A pushing device for pushing the reaction module 38 may be provided in the input chamber 321. The input chamber 321 may push the reaction modules accommodated therethrough into the reaction chamber 31.

The discharge chamber 322 is provided at the rear end of the reaction chamber 31. The discharge chamber 322 receives N reaction modules 38 from the reaction chamber 31.

In order to continuously introduce the reaction modules 38 into the reaction chamber 31, the input chamber 321, the reaction chamber 31, and the discharge chamber 322 may operate organically.

Specifically, when the input chamber 321 transfers the N reaction modules 38 from the reaction chamber 31 to the discharge chamber 322 in order to continuously supply the N reaction modules 38 to the reaction chamber 31, the input chamber 321 transfers new N reaction modules from among the plurality of reaction modules to the reaction chamber 31.

When all of the plurality of reaction modules 38 accommodated in the input chamber 321 are transferred to the reaction chamber 31 through this process, the input chamber 321 no longer transfers the reaction module to the reaction chamber 31 and the operation is terminated.

As can be seen in FIG. 10A, the input chamber 321 may include various types of lifts for continuously supplying a plurality of reaction modules 38 to the reaction chamber 31.

For example, when the input chamber 321 accommodates a plurality of reaction modules 38 in a vertical form, a plurality of reaction module holding units for mounting the plurality of reaction modules may be vertically arranged in the input chamber 321. Since the reaction module 38 is mounted on each of the plurality of reaction module holding units, the plurality of reaction modules may be moved upward and downward through a lift in the input chamber 321 in the longitudinal direction of the input chamber 321.

Figure 10B:
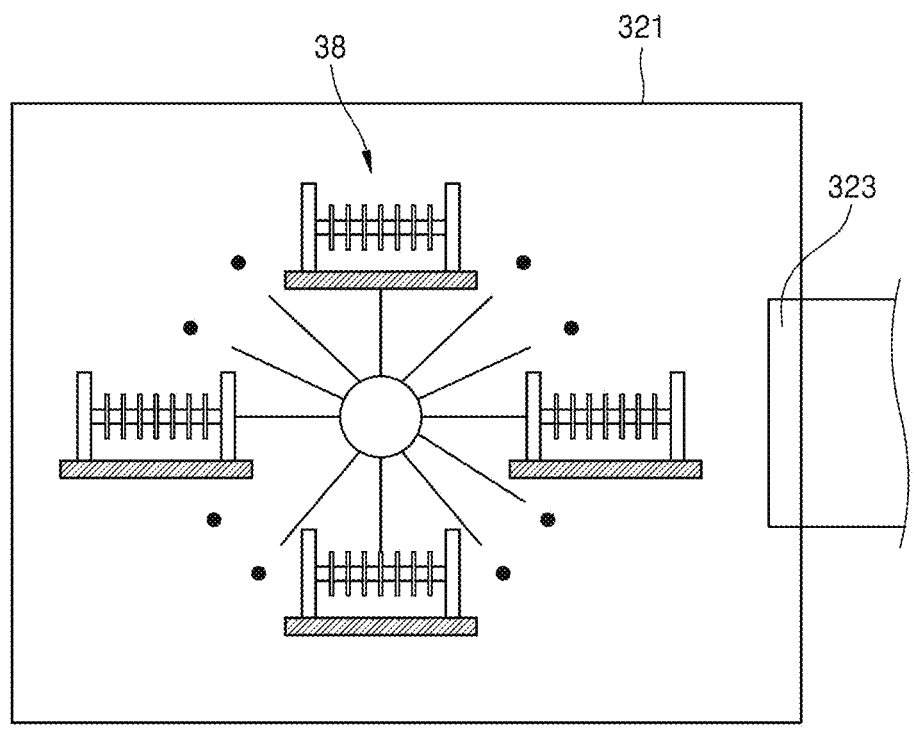
FIG. 10B is a view illustrating another embodiment of a reactor for synthesizing a nanomaterial.

Alternatively, as illustrated in FIG. 10B, there may be a case where the input chamber 321 accommodates a plurality of reaction modules in a form arranged on a circulating orbit. At this time, a plurality of reaction module holding units for mounting a plurality of reaction modules 38 are arranged on a circulating orbit in the input chamber 321, and the reaction module mounted on each of the plurality of reaction module holding units may be moved in a circulating manner along the circulating orbit through a lift.

A controller for controlling the organic operation of the input chamber 321, the reaction chamber 31, and the discharge chamber 322 as described above may be arranged.

Hereinafter, the process whereby the reaction modules 38 are continuously introduced into the reaction chamber 31 will be described.

At first, after the temperature and gas atmosphere in the reaction chamber 31 are optimized, the reaction module 38 in which the precursor structure is accommodated is accommodated into the reaction chamber 31 through the input chamber 321. At this time, since the gate 323 is positioned between the input chamber 321 and the reaction chamber 31, the reaction module 38 can be accommodated in the reaction chamber 31 while maintaining the atmosphere inside the reaction chamber 31 as much as possible.

In the input chamber 321, the above-described lift capable of transferring the reaction module 38 towards the reaction chamber 31, and additionally, the gate 323 and a vacuum pump may be installed, and thus, when the gate 323 of the reaction chamber 31 is opened, the input chamber 321 and the reaction chamber 31 are operated such that that the reaction gas atmospheres and pressures thereof are matched with each other, and the reaction module 38 is transferred from the input chamber 321 to the reaction chamber 31, and after the transfer, the gate 323 is closed.

When the gate 323 is closed, the auxiliary gate of the input chamber 321 is opened again, a new reaction module is introduced, and the gate is closed, and the new reaction module is transferred into the reaction chamber 31 by the above-described process. During this operation, the input chamber 321 uses the auxiliary gate and a vacuum pump to prevent the precursor structure of the reaction module from being contaminated, and makes the atmosphere inside the input chamber 321 similar to the atmosphere of the reaction chamber 31.

According to this method, the reaction modules 38 are sequentially transferred towards the discharge chamber 322, so that the reaction modules are horizontally stacked in the reaction chamber 31.

The reaction chamber 31 drives the reaction zone 311 for a set time to provide a reaction gas to a reaction module located in the reaction zone 311 to perform a process of growing boron nitride nanotubes in the precursor structure.

In this process, when the reaction module 38 is placed at the center of the reaction zone 311, the supply amount of the reaction gas may be adjusted so that the reaction with the reaction gas can be maintained to the maximum extent.

The continuous operation as described above may be applied as follows when an accommodation space for accommodating at least one reaction module is provided in the input chamber 321.

A transfer device capable of continuously transferring the reaction modules from the accommodation space of the input chamber 321 to the reaction chamber 31 may transfer reaction modules accommodated in the input chamber 321 to the front end of the reaction chamber 31 in the longitudinal direction of the input chamber 321 while supporting the reaction modules.

Accordingly, it is possible to accommodate at least one reaction module in the input chamber 321, and thus, whenever the reaction module is transferred to the reaction chamber 31, there is no need to individually introduce a new reaction module 38 into the auxiliary gate of the input chamber 321.

Thereafter, the gate 323 positioned between the input chamber 321 and the reaction chamber 31 performs an opening operation when the reaction module is transferred to the front end of the reaction chamber 31 by the transfer device (not shown).

The gate 323 positioned between the input chamber 321 and the reaction chamber 31 performs a closing operation when the reaction module is transferred into the reaction chamber 31 by the transfer device.

However, preferably, the closing operation of the gate 323 positioned between the input chamber 321 and the reaction chamber 31 may be performed after a predetermined number of reaction modules, which is the number of reaction modules that can be accommodated in the reaction chamber 31, are continuously transferred into the reaction chamber 31 from the input chamber 321.

Through this, at least one reaction module may be simultaneously accommodated in the reaction chamber 31 to react with the reaction gas.

Meanwhile, the discharge chamber 322 may perform an operation of discharging the reaction module from the reaction chamber 31 by inversely performing the operation of the input chamber 321 transferring the reaction module to the reaction chamber 31.

Although not shown, a separate transfer device capable of discharging the reaction module from the reaction chamber 31 and additionally, the gate 323' and a vacuum pump may be installed in the discharge chamber 322. Thus, when the gate 323' between the reaction chamber 31 and the discharge chamber 322 is opened, the discharge chamber 322 and the reaction chamber 31 operate such that the reaction gas atmospheres and pressures thereof can be matched with each other, the reaction module is transferred to the discharge chamber 322, and after the transfer, the gate 323' is closed.

When the gate 323' is closed, the auxiliary gate of the discharge chamber 322 is opened again, and the reaction module after the reaction is completed is taken out and the auxiliary gate is closed. The reaction module after the reaction is completed is discharged from the reaction chamber 31 by the above-described process. During this operation, the discharge chamber 322 is replaced with a nitrogen atmosphere similar to the atmosphere by using a vacuum pump before the auxiliary gate is opened, and after the discharge of the reaction module, contamination of a precursor block of the reaction chamber 31 should be prevented before the gate 323' is opened, and the atmosphere inside the discharge chamber 322 is made similar to the atmosphere of the reaction chamber 31.

Accordingly, the reaction modules after the reaction is completed may be sequentially discharged to the outside.

Thereafter, the gate 323' is opened and the reaction module is transferred to the discharge chamber 322, and after the gate 323' is closed, the reaction module may be discharged from the discharge chamber 322.

The continuous operation as described above may be applied as follows when an accommodation space for accommodating at least one reaction module is arranged in the discharge chamber 322.

A transfer device capable of continuously transferring the reaction modules, in which the reaction has been completed, from the reaction chamber 31 to the accommodation space of the discharge chamber 322 may transfer the reaction modules 38 accommodated in the discharge chamber 322 to the auxiliary gate of the discharge chamber 322 in the longitudinal direction of the discharge chamber 322 while supporting the reaction modules 38.

Through this, it is possible to accommodate at least one reaction module in the discharge chamber 322, and thus, whenever the reaction module is transferred to the reaction chamber 31, there is no need to individually take out the reaction module after the reaction is completed, through the auxiliary gate of the discharge chamber 322.

Thereafter, the gate 323' positioned between the discharge chamber 322 and the reaction chamber 31 performs an opening operation when the reaction module is transferred to the rear end of the reaction chamber 31 by the transfer device (not shown).

The gate 323' positioned between the discharge chamber 322 and the reaction chamber 31 performs a closing operation again when the reaction module is transferred into the reaction chamber 31.

However, preferably, the closing operation of the gate 323' positioned between the discharge chamber 322 and the reaction chamber 31 may be performed after a predetermined number of reaction modules, which is the number of reaction modules that can be accommodated in the reaction chamber 31, are transferred from the input chamber 321 into the reaction chamber 31.

In the case of growing BNNTs by thermally treating powder using a commonly used batch-type method, after a single reaction module is installed, it is required to perform processes of increasing the temperature of a heat treatment device, maintaining the temperature, synthesizing boron nitride (BN), growing BNNTs, lowering the temperature, cooling at room temperature, and recovering reactants. Thus, there is a limitation in a single yield due to the single reaction module, and it is difficult to ensure economic efficiency due to the increase in costs such as energy and time.

However, according to an embodiment of the present disclosure, BNNTs are continuously manufactured in line using the above-described method, and thus the production yield and productivity of BNNTs may be maximized.

Figure 11:
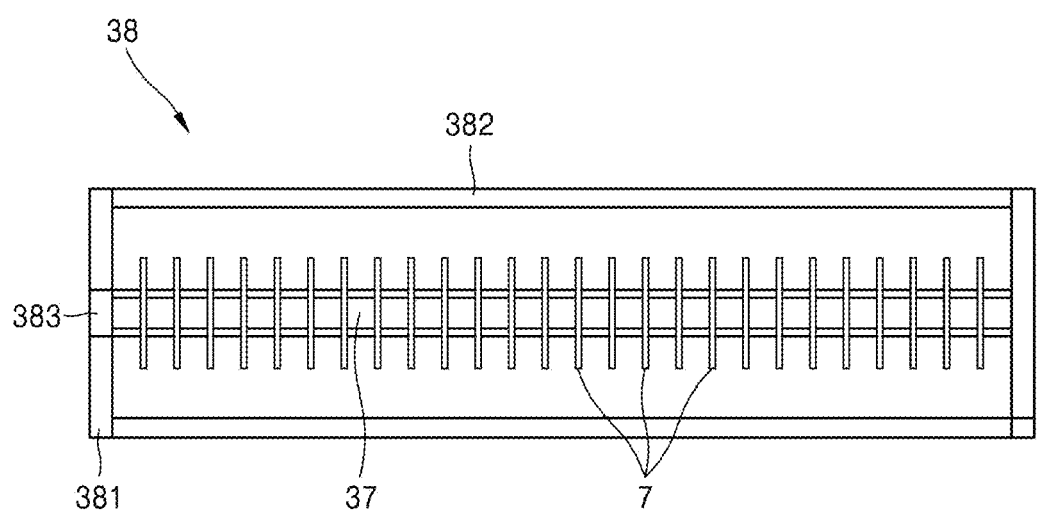
FIG. 11 is a view illustrating an embodiment of a reaction module for a nanomaterial synthesis reaction.

The precursor structure 7 may be provided inside the reaction module 38 in the reaction chamber 31 as described above. As can be seen in FIG. 11, a holder 37 is allowed to pass through one or more precursor structures 7, and then the holder 37 may be positioned in at least the reaction zone 311 inside the reaction chamber 31. The holder 37 may be provided in a direction parallel to the longitudinal direction of the reaction chamber 31.

According to one embodiment of the present disclosure, a reaction module as illustrated in FIG. 11 may be arranged to accommodate the precursor structures 7.

The holder 37 through which one or more precursor structures 7 are provided to pass is accommodated in the reaction module.

That is, as shown in FIG. 11, the precursor structures 7 are accommodated using the reaction module 38, and the reaction modules may be continuously supplied into the reaction chamber 31 as can be seen in FIGS. 10A and 10B.

The reaction module includes a pair of supports 381 facing each other, and a housing 382 having, between the supports 381, an accommodation space in which the holder 37 is accommodated. The holder 37 may be coupled to the supports 381. The holder 37 may be provided to pass through holes formed in the supports 381 so that the supports 381 are detachable from the holder 37, and as described above, the precursor structures 7 may be arranged in the holder 37. The supports 381 may be formed of alumina, which is a heat-resistant material, but the present disclosure is not necessarily limited thereto.

Although not shown in the drawings, at least one hole may be formed in the supports 381. Through the hole, the pressure of the reaction gas in the reaction module is prevented from being excessively maintained by the supports 381, and the pressure of the reaction gas in the reaction chamber 31 may be appropriately maintained. By positioning these holes at a position symmetrical to the pair of supports 381, it may be possible to make the reaction gas smoothly have a uniform flow on both sides.

As such, according to an embodiment of the present disclosure, by placing at least one or a plurality of precursor structures 7 in the holder 37, BNNTs may be synthesized and grown simultaneously using at least one or a plurality of precursor structures 7. Thus, the reaction space in the reaction chamber 31 may be utilized to the maximum extent, and thus productivity and/or mass production may be maximized.

The precursor structures 7 may be provided in the holder 37 to be separated from each other at constant intervals, and by adjusting the interval between the precursor structures 7, the number of precursor blocks to be fed into the reaction chamber 31 may be adjusted.

At least one notch (not shown) may be formed in the holder 37, and the precursor structures 7 may be fixed to the holder 37 along the at least one notch (not shown). Thus, by adjusting the interval between notches (not shown), the interval between precursor structures to be installed and/or the number of the precursor structures may be adjusted.

Figure 12A:
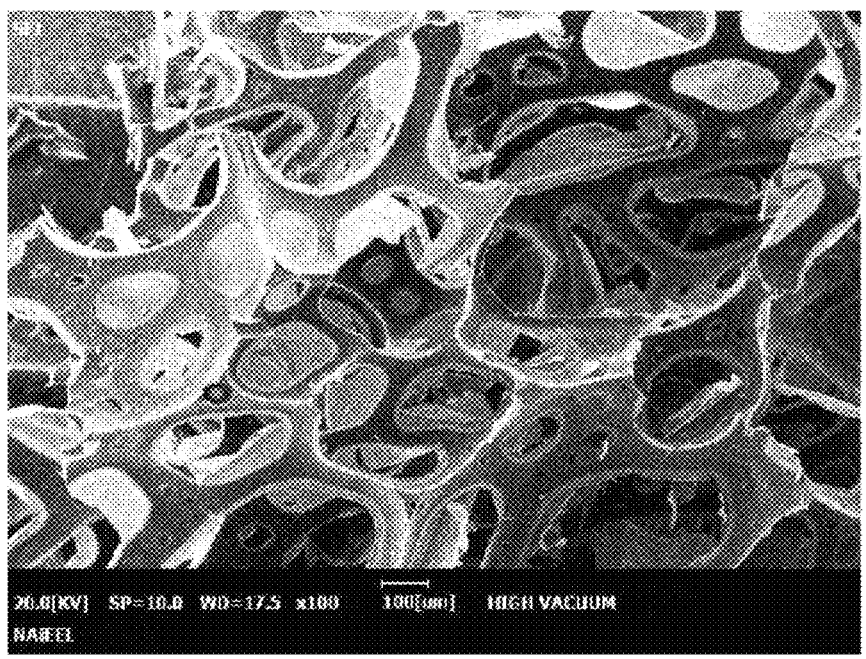
FIG. 12A is a scanning electron microscope (SEM) image of a precursor prepared according to an embodiment of the present disclosure.
Figure 12B:
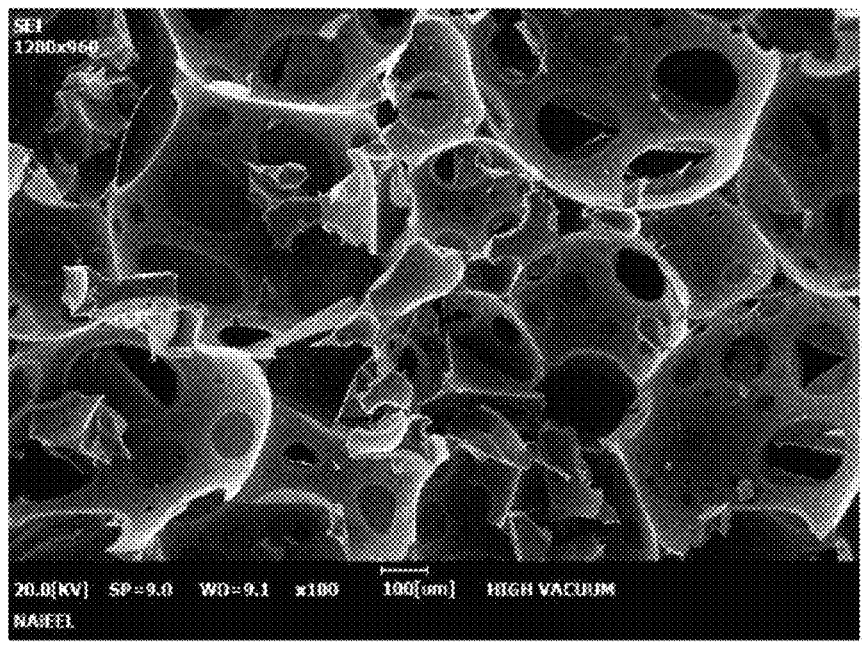
FIG. 12B is an SEM image of a precursor prepared according to a comparative example.
Figure 13A:
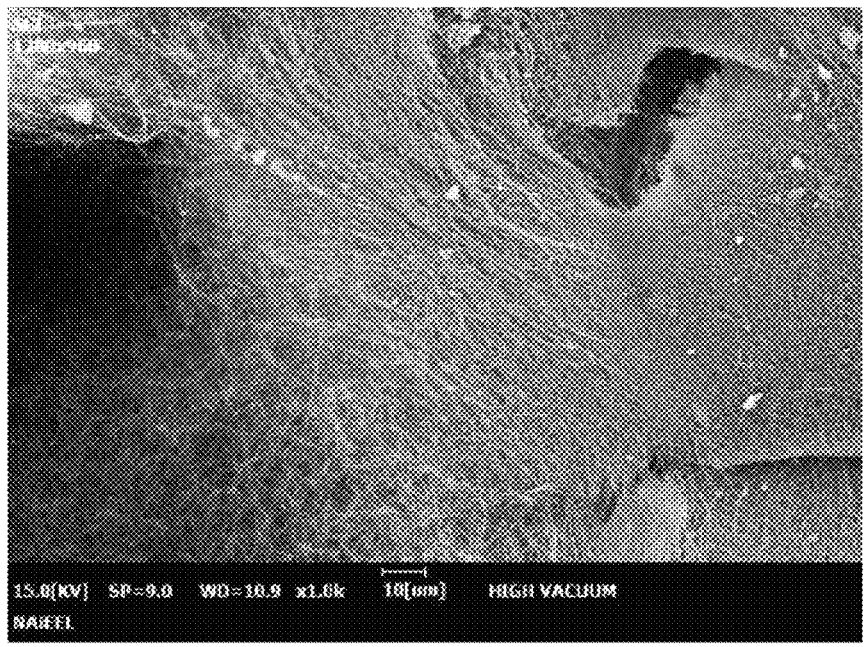
FIG. 13A is an SEM image of BNNTs manufactured according to an embodiment of the present disclosure.
Figure 13B:
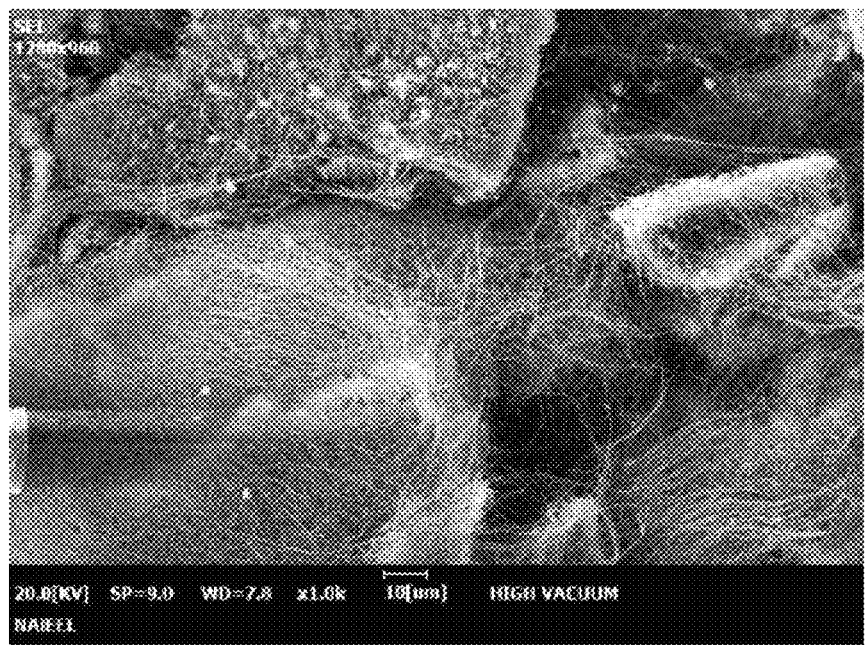
FIG. 13B is an SEM image of BNNTs manufactured according to a comparative example.

FIG. 12A is an SEM image of a precursor structure made using a solution formed as illustrated in at least one of FIGS. 3 to 5. FIG. 12B is an SEM image of a precursor structure formed by mixing second powder with a binder and calcining the mixture, without using a solution. FIG. 13A is an SEM image of a BNNT nanomaterial formed by reacting the precursor structure of FIG. 12A. FIG. 13B is an SEM image of a BNNT nanomaterial formed by reacting the precursor structure of FIG. 12B. The binder is mostly sublimated in a high-temperature heat treatment process in which the second power, which is precursor powder, is sintered to cause a nitration reaction, and thus may be removed in a gas phase.

As shown in FIG. 12A, it can be seen that the precursor structure formed using the method of the present disclosure that uses a solution has a small size of pores and a uniform pore distribution, as compared to the precursor structure obtained by mixing second powder with a binder and sintering the mixture, as illustrated in FIG. 12B. It can also be seen that the obtained BNNT nanomaterial constitutes uniform and high-quality BNNTs with less fine impurities in the case of histological BNNT synthesis from the structure as can be seen in FIG. 13A, as compared to the case of histological BNNT synthesis from the structure as can be seen in FIG. 13B.

As described above, according to the present disclosure, a nanomaterial may be formed using a porous precursor structure prepared using a dispersion solution to obtain a high-quality nanomaterial. In addition, when the structure is formed using a dispersion solution, the dispersibility of precursor powder nanoparticles can be improved, and since molding is easily and rapidly performed using a mold, a precursor structure may be mass-produced, and thus productivity is further increased.

While the present disclosure has been described with reference to embodiments illustrated in the drawings, the embodiments are provided only for illustrative purposes, and it will be understood by those of ordinary skill in the art that various changes and other embodiments equivalent thereto may be made therefrom. Therefore, the true technical protection scope of the present disclosure should be defined by the technical spirit of the appended claims.

The particular implementations shown and described herein are illustrative examples of embodiments and are not intended to otherwise limit the scope of embodiments in any way. For the sake of brevity, conventional electronics, control systems, software, and other functional aspects of the systems may not be described in detail. Furthermore, the connecting lines, or connectors shown in the various figures presented are intended to represent example functional relationships and/or physical or logical couplings between the various elements, and it should be noted that many alternative or additional functional relationships, physical connections or logical connections may be present in a practical device. Moreover, no item or component is essential to the practice of embodiments unless the element is specifically described as "essential" or "critical."

The use of the terms "the" and similar referents in the context of describing embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Embodiments are not limited to the described order of the steps. The use of any and all examples, or example language (e.g., "such as") provided herein, is intended merely to better illuminate embodiments and does not pose a limitation on the scope of embodiments unless otherwise claimed. In addition, it will become apparent to those of ordinary skill in the art that various changes, combinations, and modifications may be made without departing from the scope of the appended claims or equivalents thereto according to design conditions and factors.

The invention claimed is:

1. A method of manufacturing a boron nitride nanotube, the method comprising:
preparing a powder including a first material having a boron and a second material having a catalyst material;
forming a dispersion solution including the powder and a third material and a fourth material including a foaming agent;
accommodating the dispersion solution in a mold and heating the dispersion solution in the mold at a temperature between 200° C. and 250° C. to decompose the third material into water vapor and carbon, and dissociate the foaming agent to carbon dioxide to form a structure, wherein the carbon acts as a support inside the structure, and the structure is a precursor for synthesis of the boron nitride nanotube;

further comprising subjecting the structure to an oxidation treatment;

generating pores in the structure based on the water vapor and the carbon dioxide; and synthesizing the boron nitride nanotube using the structure, wherein the third material includes at least one of sucrose and water-soluble polymer, and the foaming agent accelerates generation of at least one of air bubbles and the pores during formation of the structure.

2. The method of claim 1, wherein the preparing of the powder is accomplished by:

preparing a first powder including the first material and the second material;

mixing the first and second materials through a mixer;

homogenizing the first and second materials in a predetermined particle size to form the first powder;

introducing the first powder into a pulverized region formed by air to form a second powder; and collecting the second powder.

3. The method of claim 1, wherein the catalyst material is at least one material selected from the group consisting of MgO, Fe, FeO, $Fe_2O_3$, $Li_2O$, and $MgB_2$.

4. The method of claim 1, further comprising subjecting the structure to an oxidation treatment.

5. The method of any one of claims 1 to 3 and 4, wherein the method includes:

transferring the structure to a reaction zone of a reaction chamber; and driving the reaction zone to synthesize the boron nitride nanotube using the structure.

* * * * *